S. M. WOODBRIDGE.
PRECOOLING APPARATUS FOR FRUIT.
APPLICATION FILED JUNE 23, 1910.
1,017,723.
Patented Feb. 20, 1912.
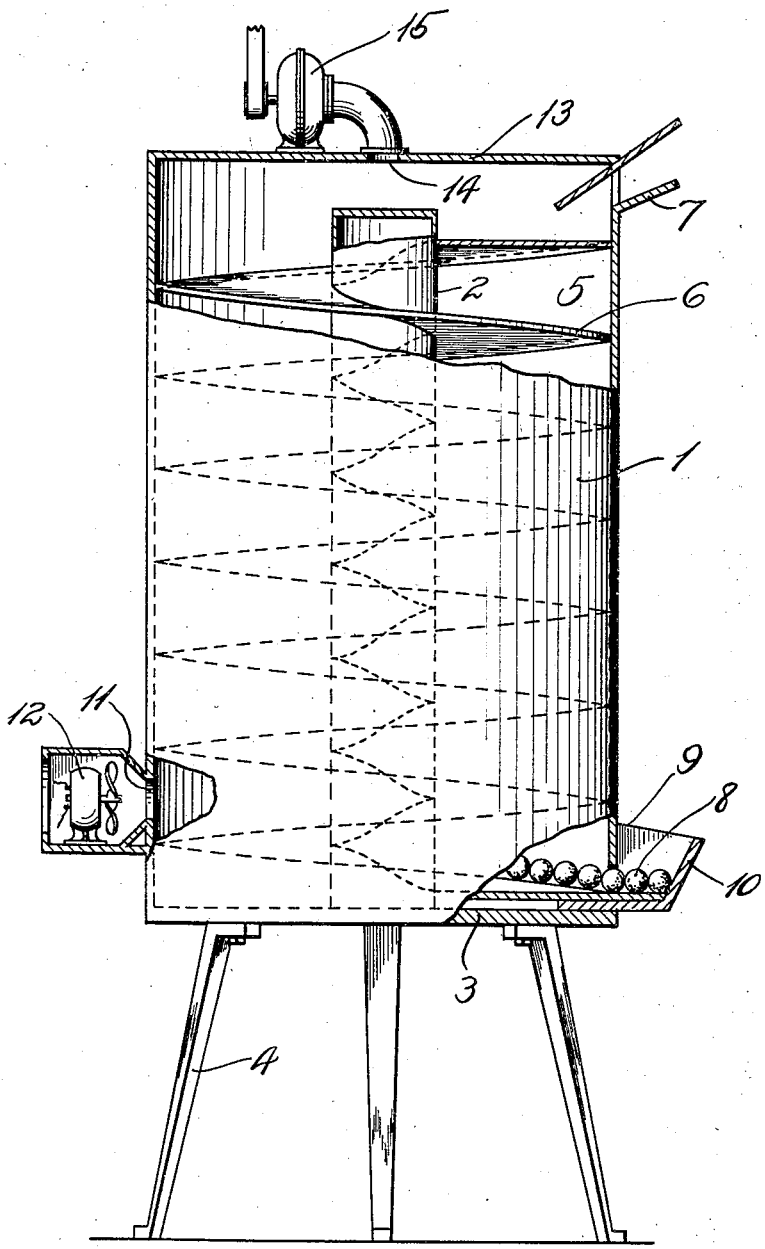
Witnesses.
Inventor.
Samuel M. Woodbridge.
By
Attys.

UNITED STATES PATENT OFFICE.

SAMUEL M. WOODBRIDGE, OF SAN BERNARDINO, CALIFORNIA.

PRECOOLING APPARATUS FOR FRUIT.

1,017,723.  Specification of Letters Patent.  Patented Feb. 20, 1912.

Application filed June 28, 1910. Serial No. 569,314.

*To all whom it may concern:*

Be it known that I, SAMUEL M. WOODBRIDGE, a citizen of the United States, residing at San Bernardino, county of San Bernardino, State of California, have invented certain useful Improvements in Precooling Apparatus for Fruit, of which the following is a specification.

This invention relates to apparatus for pre-cooling fruit.

According to the usual method for precooling fruit the pre-cooling is effected while the fruit is held in shipping cases or boxes. This method is unsatisfactory as the fruit on the interior of the case is not as effectively pre-cooled as the outer layers.

The object of this invention is to provide improved apparatus for pre-cooling fruit before it is packed and an arrangement is provided for insuring that the temperature of the fruit will be reduced as it passes through the apparatus.

In the drawing forming a part of the annexed specification, the figure is a side elevation of my apparatus certain parts being broken away and shown in cross section.

Referring more particularly to the parts, 1 represents the case of the apparatus which is preferably in the form of a cylinder having its axis in a vertical position and on the axis of this cylinder a center post or core 2 is placed. The case is formed of a bottom head or base 3 which is supported upon the legs 4 as shown. The upper end of the post 2 is closed so that the interior of this post does not connect with the cooling chamber 5 formed within the case 1.

Within the case 1 and surrounding the post 2 I provide a helical blade or chute 6 which extends continuously from the upper end of the case to the lower end as shown. The upper end of this plate or chute 6 is adapted to receive the fruit from the delivery mouth 7 of a charging hopper and the lower end of the chute delivers the fruit 8 as indicated through a delivery opening 9 in the wall of the case and at this delivery opening a delivery hopper 10 is formed.

The fruit, such as oranges, is charged on to the upper end of the chute 6 and the chute 6 is kept completely covered by a single layer of fruit. The outer wall of the discharge hopper 10 prevents the fruit from discharging itself from the apparatus, the arrangement being such that as the fruit is removed from the hopper 10 the entire body of the fruit within the apparatus gravitates slowly toward its lower end. Near its lower end the case 1 is provided with an opening 11 in the side wall thereof adjacent to which a blower fan 12 is mounted which drives a cooling air current into the cooling chamber and this air current directs itself upwardly around the coils of the chute 6, the upper end or head 13 of the case is provided with a suction opening 14 at which a suction fan 15 is attached which assists the movement of the cooling air current.

The temperature conditions of the fruit which is taken from the delivery hopper 10 is an indication of the efficiency of the apparatus and by removing the fruit faster or slower the cooling process may be made less extended or more extended.

The apparatus is especially useful in the cooling of citrus fruits such as oranges and lemons and it will be evident that as they descend through the cooling chamber they will roll over and over so that they present all sides to the cooling effect of the current.

It should be understood that the inclination of the chute is very slight so that the oranges will not pile up on each other under the force of gravity, but they will simply form a single layer on the chute.

What I claim is:—

A precooling apparatus, comprising a cylindrical chamber having a central post, a spiral chute arranged in the annular space between said post, and the chamber wall, the inclination of said spiral chute being slight to enable the fruit to pass through the apparatus in a single layer, a discharge hopper at the lower end of the spiral chute adapted to prevent the spiral chute from discharging itself, and means for forcing a cooling air current along the chute as the fruit descends.

In witness that I claim the foregoing I have hereunto subscribed my name this 22nd day of June, 1910.

SAMUEL M. WOODBRIDGE.

Witnesses:
F. D. AMMEN,
EDMUND A. STRAUSE.